(12) United States Patent
Uda et al.

(10) Patent No.: US 12,526,710 B2
(45) Date of Patent: Jan. 13, 2026

(54) MEASUREMENT APPARATUS AND NON-PSC CONNECTION METHOD THEREFOR

(71) Applicant: ANRITSU CORPORATION, Kanagawa (JP)

(72) Inventors: Yasuko Uda, Kanagawa (JP); Kazuyuki Koike, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 18/517,571

(22) Filed: Nov. 22, 2023

(65) Prior Publication Data

US 2024/0276328 A1 Aug. 15, 2024

(30) Foreign Application Priority Data

Feb. 15, 2023 (JP) ................. 2023-021336

(51) Int. Cl.
*H04W 36/06* (2009.01)
*H04W 72/0453* (2023.01)

(52) U.S. Cl.
CPC ....... *H04W 36/06* (2013.01); *H04W 72/0453* (2013.01)

(58) Field of Classification Search
CPC ............ H04W 36/06; H04W 72/0453; H04W 36/0085; H04W 84/12; H04B 17/0085; H04B 17/382
USPC ........................................ 370/311
See application file for complete search history.

(56) References Cited

U.S. PATENT DOCUMENTS

| 2015/0334579 | A1* | 11/2015 | Lin ....................... H04W 48/14 370/329 |
| 2016/0073414 | A1* | 3/2016 | Li ...................... H04W 72/0453 370/330 |
| 2023/0041365 | A1* | 2/2023 | Gidvani ................ H04W 48/16 |
| 2023/0096288 | A1* | 3/2023 | Kim ....................... H04W 24/08 370/252 |

FOREIGN PATENT DOCUMENTS

CN 108174452 A * 6/2018 .......... H04W 72/541
JP 2022-175642 A 11/2022

* cited by examiner

*Primary Examiner* — Ayman A Abaza
*Assistant Examiner* — Abdul Aziz Santarisi
(74) *Attorney, Agent, or Firm* — McDonald Hopkins LLC

(57) ABSTRACT

The measurement apparatus includes a signal generation unit 11 that generates control data for communicating with a DUT 100 and various data related to measurement, a channel selection control unit 12 that selects one channel to be used from among a plurality of channels supported by the DUT, a wireless communication unit 13 that makes a network connection with the DUT on the channel selected by the channel selection control unit 12, an RF measurement unit 14 that measures transmission and reception characteristics of the DUT on the channel through which the network connection between the wireless communication unit 13 and the DUT are made, and a control unit 16 that automatically makes a connection on PSC, and then transmits a channel switching instruction to the DUT to switch the connection to Non-PSC, when there is a channel connection instruction from a user and the channel is Non-PSC.

4 Claims, 2 Drawing Sheets

MEASUREMENT APPARATUS AND NON-PSC CONNECTION METHOD THEREFOR

TECHNICAL FIELD

The present invention relates to a measurement apparatus, and more particularly, to a measurement apparatus which measures a radio signal transmitted and received by a communication device that operates in accordance with a communication standard of a wireless Local Area Network (LAN).

BACKGROUND ART

Various wireless communication technologies are developed along with development of information communication technologies. Among these, as a communication standard related to a wireless LAN technology, for example, Institute of Electrical and Electronics Engineers (IEEE) 802.11 standard is known.

In the IEEE 802.11 standard, the concept of Preferred Scanning Channel (PSC) has been added as a specification specific to the 6 GHz band.

PSC is placed every four channels of 20 MHz bandwidth, and the other channels are Non-Preferred Scanning Channel (Non-PSC). The center frequency of PSC is calculated by the following formula.

$$\text{PSC center frequency} = 5940 - 55 + 80 \times n \text{(MHz)} \quad n = 1, \ldots, 15$$

As a rule of PSC and Non-PSC,
1. An Access Point (AP) as a wireless LAN master device that supports only the 6 GHz band uses PSC as the Primary Channel.
2. A Non-PSC prohibits Active Scan, in which a station (STA) as a wireless LAN slave device asks AP whether communication is possible using a channel.

or the like have been determined.

By concentrating the scanning operation on PSC according to the rule of 2., it can be expected that the load on Non-PSC will be reduced.

In Passive Scan in which broadcast information transmitted by APs is monitored and an AP with which STA can communicate is searched for, it is necessary to monitor at least about 200 ms per channel. When all 43 Non-PSC channels in the 6 GHz band are checked, it takes nearly 8.5 seconds.

Therefore, an STA such as a smartphone may scan only PSC without scanning all channels.

Even when such an STA attempts to measure all channels, because a connection is made only on PSC, a connection is not made on Non-PSC, so there is a problem in that measurement cannot be performed.

In Patent Document 1, a measurement apparatus that is an AP uses a Channel Switch Announcement (CSA) mechanism to cause a Device Under Test (DUT) such as a smartphone that is an AP to switch the channel from PSC to Non-PSC for measurement.

RELATED ART DOCUMENT

Patent Document

[Patent Document 1] JP-A-2022-175642

DISCLOSURE OF THE INVENTION

Problem that the Invention is to Solve

However, in such a measurement apparatus, the user needs to know whether the channel to be measured is PSC or Non-PSC and perform an operation to switch to Non-PSC after connecting to the DUT on PSC first, in the case of Non-PSC, which poses a problem that the measurement procedure becomes complicated.

Accordingly, an object of the present invention is to provide a measurement apparatus capable of measuring any channel without the user being aware of whether the channel is PSC or Non-PSC.

Means for Solving the Problem

According to the present invention, there is provided a measurement apparatus which includes a control unit, and measures a radio signal transmitted and received by a communication device to measure transmission and reception characteristics of the communication device, in which when the control unit determines that a channel to which a connection instruction is input is Non-PSC, the control unit connects to the communication device on PSC, and transmits a channel switching instruction to the communication device to switch to Non-PSC.

With this configuration, when there is a channel connection instruction from the user, in a case where the channel is Non-PSC, a connection is automatically made on PSC and then the channel is switched to Non-PSC. Therefore, it is possible to measure any channel without the user being aware of whether the channel is PSC or Non-PSC.

Further, the measurement apparatus of the present invention may be configured to use a Channel Switch Announcement frame or an Extended Channel Switch Announcement frame defined in IEEE 802.11, as the channel switching instruction.

With this configuration, the Channel Switch Announcement frame or the Extended Channel Switch Announcement frame defined in IEEE 802.11 is used as the channel switching instruction. This allows channel switching without defining and enabling a special channel switching instruction.

According to the present invention, there is provided a Non-PSC connection method for a measurement apparatus which measures a radio signal transmitted and received by a communication device to measure transmission and reception characteristics of the communication device, the Non-PSC connection method including: a step of determining that a channel to which a connection instruction is input is Non-PSC; a step of connecting to the communication device on PSC after it is determined that the channel is Non-PSC; and a step of transmitting a channel switching instruction to the communication device to switch to Non-PSC, after the connection is made on PSC.

With this configuration, when there is a channel connection instruction from the user, in a case where the channel is Non-PSC, a connection is automatically made on PSC and then the channel is switched to Non-PSC. Therefore, it is possible to measure any channel without the user being aware of whether the channel is PSC or Non-PSC.

Further, the Non-PSC connection method of the present invention may be configured to use a Channel Switch Announcement frame or an Extended Channel Switch Announcement frame defined in IEEE 802.11, as the channel switching instruction.

With this configuration, the Channel Switch Announcement frame or the Extended Channel Switch Announcement frame defined in IEEE 802.11 is used as the channel switching instruction. This allows channel switching without defining and enabling a special channel switching instruction.

Advantage of the Invention

The present invention can provide a measurement apparatus capable of measuring any channel without the user being aware of whether the channel is PSC or Non-PSC.

BEST MODE FOR CARRYING OUT THE INVENTION

Hereinafter, a measurement apparatus according to an embodiment of the present invention will be described in detail with reference to the drawings.

Figure 1:
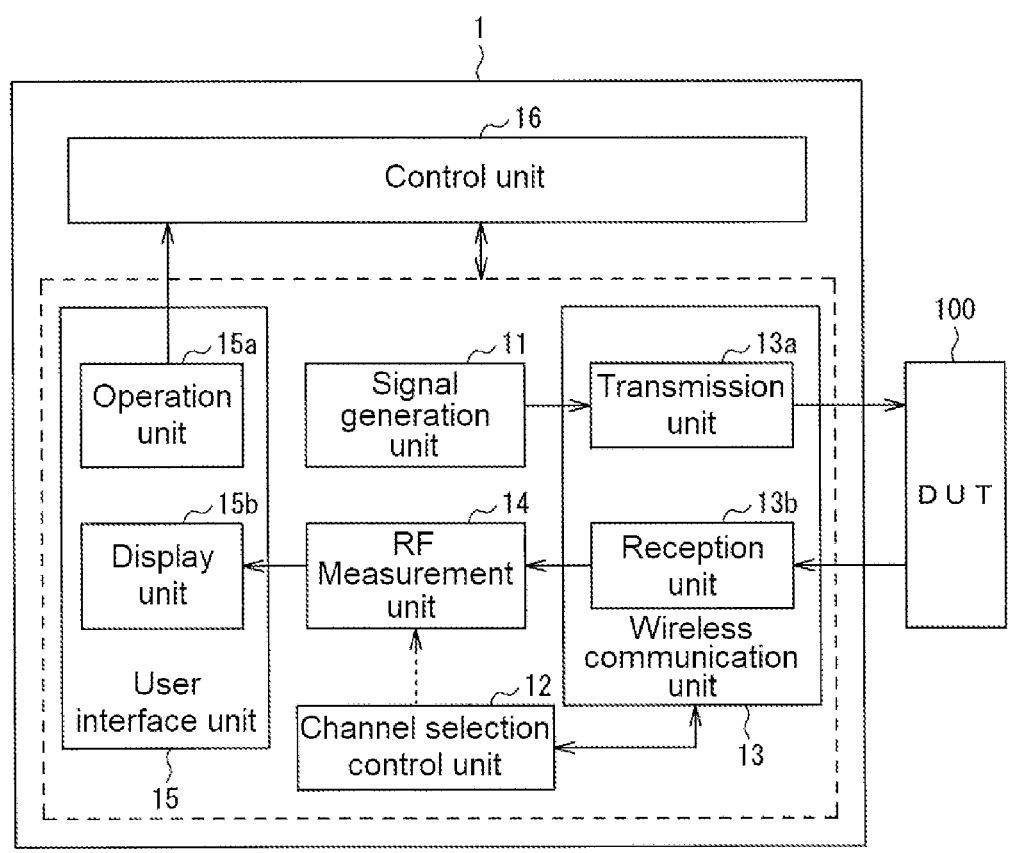
FIG. 1 is a block diagram of a measurement apparatus according to an embodiment of the present invention.

As shown in FIG. 1, a measurement apparatus 1 according to the present embodiment performs wireless communication with a DUT 100, which is a communication device, to measure transmission and reception characteristics of the DUT 100. The frequency bands to be measured by the measurement apparatus 1 of the present embodiment are, for example, 2.4 GHz band, 5 GHz band, 6 GHz band, and the like. In the present embodiment, the measurement apparatus 1 operates as an AP and the DUT 100 operates as an STA. The DUT 100 is, for example, a transmission device such as a router, or a mobile terminal such as a smart phone or a laptop computer. Note that the measurement apparatus 1 wirelessly communicates with the DUT 100 according to the communication standard conforming to IEEE 802.11.

In FIG. 1, a measurement apparatus 1 according to an embodiment of the present invention includes a signal generation unit 11, a channel selection control unit 12, a wireless communication unit 13, an RF measurement unit 14, a user interface unit 15, and a control unit 16, and is configured to measure the transmission and reception characteristics of the DUT 100 by using a wireless line composed of a plurality of channels.

The signal generation unit 11 generates signals including control data for communicating with the DUT 100 and various data related to measurement.

The channel selection control unit 12 selects one channel to be used by the DUT 100 from among the plurality of channels supported by the DUT 100.

The wireless communication unit 13 makes a network connection (wireless communication connection) with the DUT 100 on the channel selected by the channel selection control unit 12. Note that the DUT 100 and the wireless communication unit 13 may be network-connected by wire connection through a coaxial cable or the like. Alternatively, the DUT 100 and the wireless communication unit 13 may be network-connected by installing the DUT 100 and the wireless communication antenna in an electromagnetic anechoic chamber and wirelessly connecting the DUT 100 and the wireless communication unit 13 via the wireless communication antenna.

The wireless communication unit 13 includes a transmission unit 13a and a reception unit 13b, and establishes a network connection with the DUT 100 according to a communication standard conforming to IEEE 802.11, for example. Further, the transmission unit 13a and the reception unit 13b transmit and receive various types of data related to measurement to and from the DUT 100, after the network connection is established.

The transmission unit 13a includes an encoding processing circuit, a modulation circuit, a digital-to-analog converter (DAC), an up-converter, or the like, converts the signal generated by the signal generation unit 11 into a radio signal, and transmits the radio signal to the DUT 100. The reception unit 13b includes a down converter, an analog-to-digital converter (ADC), or the like, and performs a reception process of the radio signal transmitted from the DUT 100.

The RF measurement unit 14 measures the transmission and reception characteristics of the DUT 100 on the channel through which the network connection between the wireless communication unit 13 and the DUT 100 are made. The RF measurement unit 14 receives the radio signal transmitted from the DUT 100 via the reception unit 13b and measures the transmission and reception characteristics of the DUT 100. The RF measurement unit 14 can measure, for example, transmission power, error vector magnitude (EVM), In-phase Quadrature-phase (IQ) constellation, spectrum, or the like, as the transmission characteristics of the DUT 100. Further, RF measurement unit 14 can measure, for example, a Packet Error Rate (PER), a Frame Reception Rate (FRR), and the like, as the reception characteristics of the DUT 100.

The user interface unit 15 includes an operation unit 15a and a display unit 15b. The operation unit 15a is for receiving an operation input by the user, and is composed of, for example, a touch panel including a touch sensor for detecting a contact position by a contact operation with the input surface corresponding to the display screen of the display unit 15b. When the user touches the position of a specific item displayed on the display screen with a finger, a stylus, or the like, the operation unit 15a recognizes the match between the position detected by the touch sensor on the display screen and the position of the item, and outputs a signal for executing the function assigned to each item to the control unit 16. The operation unit 15a may be operably displayed on the display unit 15b, or may be configured to include an input device such as a keyboard or a mouse.

By the user's operation input to the operation unit 15a, the channel to be used for a network connection between the wireless communication unit 13 and the DUT 100, the type of RF measurement to be executed by the RF measurement unit 14, and the instruction to start RF measurement can be set.

The display unit 15b is configured with a display device such as a liquid crystal display or a CRT, and displays various display contents such as a setting screen or a measurement result related to the RF measurement for the DUT 100 on the display screen, based on display control by the control unit 16. Further, the display unit 15b displays an operation target such as a button, a soft key, a pull-down menu, and a text box for setting various conditions.

The control unit 16 is a computer unit including a central processing unit (CPU), a random access memory (RAM), a read only memory (ROM), a hard disk device, and an input and output port (not illustrated).

The ROM and the hard disk device of this computer unit store various control constants, various maps, and the like, as well as a program for causing the computer unit to function as the control unit 16. That is, the computer unit functions as the control unit 16 by the CPU executing the program stored in the ROM and the hard disk device. The hard disk device may be a compact flash (CF) card by a flash memory.

The input and output ports of the control unit 16 are connected to the signal generation unit 11, the channel selection control unit 12, the RF measurement unit 14, and the user interface unit 15, so that the control unit 16 and each unit can transmit and receive signals.

At least part of the signal generation unit 11, the channel selection control unit 12, and the RF measurement unit 14 may be configured as software and run on the computer unit which is the control unit 16.

At least part of the signal generation unit 11, the channel selection control unit 12, and the RF measurement unit 14 may be configured by a digital circuit such as a field programmable gate array (FPGA), an application specific integrated circuit (ASIC), or the like.

At least part of the signal generation unit 11, the channel selection control unit 12, and the RF measurement unit 14 may be configured by appropriately combining a hardware process by the digital circuit and a software process by the predetermined program.

At least part of the control unit 16, the signal generation unit 11, the channel selection control unit 12, and the RF measurement unit 14 may be configured as software that operates on a personal computer that can communicate with the measurement apparatus 1.

In the present embodiment, when Non-PSC is designated as a channel to be used for a network connection between the wireless communication unit 13 and the DUT 100 by the user's operation input to the operation unit 15a, the control unit 16 automatically makes a network connection with the DUT 100 on PSC, and then transmits a channel switching instruction to the DUT 100 to switch the network connection from the connected PSC to the designated Non-PSC.

The control unit 16 uses, for example, the Channel Switch Announcement frame or the Extended Channel Switch Announcement frame defined in IEEE 802.11 as a channel switching instruction to switch the channel without disconnecting the network connection with the DUT 100.

In addition to the Channel Switch Announcement frame, it is also possible to add information for making a notification of the channel to be changed to a beacon frame, a Probe Response frame, or the like to cause the DUT 100 to change the channel. Further, when a frame which is same as or similar to the Channel Switch Announcement frame is defined in the future, the new frame may be used for channel change.

It is assumed that the user can set whether or not to use this function. In a case where this function is turned off by the user's operation input to the operation unit 15a, even when Non-PSC is designated as a channel to be used for a network connection between the wireless communication unit 13 and the DUT 100, the control unit 16 makes a network connection with the DUT 100 by using the designated Non-PSC.

Figure 2:
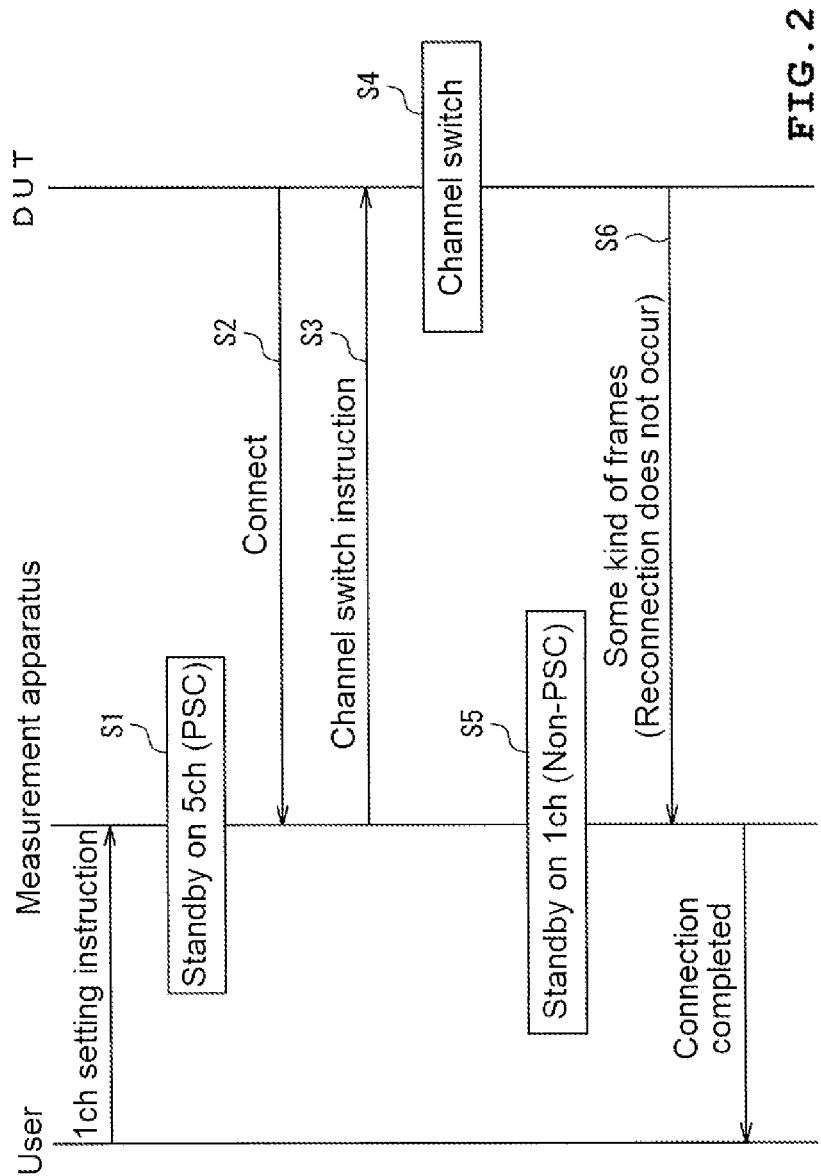
FIG. 2 is a sequence diagram illustrating a procedure of a Non-PSC connection process of the measurement apparatus according to the embodiment of the present invention.

A Non-PSC connection process by the measurement apparatus 1 according to the present embodiment configured as described above will be described with reference to FIG. 2.

When an instruction to set connection on 1ch is input by the user's operation input to the operation unit 15a, in step S1, if it is determined that 1ch is Non-PSC, the control unit 16 selects, for example, 5ch which is the closest PSC on the frequency, and instructs the channel selection control unit 12 to perform connection on 5ch.

The channel selection control unit 12 outputs to the wireless communication unit 13 a frequency change instruction for network connection between the wireless communication unit 13 and the DUT 100 using 5ch.

The wireless communication unit 13 switches its own channel to 5ch and transmits to the DUT 100 a beacon frame including information indicating that 5ch is a usable channel.

When the DUT 100 scans all the channels that the DUT 100 supports, and detects the measurement apparatus 1 using 5ch, based on the information on the beacon frame transmitted from the wireless communication unit 13, the DUT 100 makes a network connection on 5ch in step S2.

When the connection procedure with the DUT 100 is completed, the wireless communication unit 13 notifies the control unit 16 that the connection has been completed.

In step S3, upon receiving the notification that a connection on PSC has been completed, the control unit 16 instructs the channel selection control unit 12 to switch the connection channel to 1ch.

The channel selection control unit 12 outputs to the wireless communication unit 13 a transmission instruction for transmitting a Channel Switch Announcement frame including information on the 1ch of the switching destination to the DUT 100.

The wireless communication unit 13 transmits to the DUT 100 a Channel Switch Announcement frame including information on 1ch of the switching destination.

The wireless communication unit 13 notifies the channel selection control unit 12 that transmission of the Channel Switch Announcement frame to the DUT 100 has been completed.

In step S4, the DUT 100 scans all the channels that the DUT 100 supports in order to switch to 1ch that is set as the switching destination channel in the Channel Switch Announcement frame.

In step S5, the channel selection control unit 12 outputs to the wireless communication unit 13 a frequency change instruction for network connection between the wireless communication unit 13 and the DUT 100 using 1ch.

The wireless communication unit 13 switches its own channel to 1ch and transmits to the DUT 100 a beacon frame including information indicating that 1ch is a usable channel.

In step S6, the DUT 100 confirms that the wireless communication unit 13 is using 1ch, based on the information in the beacon frame transmitted from the wireless communication unit 13, switches its own channel to 1ch, and transmits some kind of wireless LAN frame (for example, a Null frame) to the wireless communication unit 13.

The wireless communication unit 13 notifies the channel selection control unit 12 that some kind of wireless LAN frame has been received from the DUT 100, and the channel selection control unit 12 notifies the control unit 16 that channel switching has been completed.

When the channel selection control unit 12 notifies that channel switching has been completed, the control unit 16 displays a message or the like notifying the user that the connection has been completed on the display unit 15b of the user interface unit 15.

In addition, until the user is notified that the connection is completed after an instruction to set the connection on 1ch is input by the user's operation input to the operation unit 15a, the control unit 16 may display a message or the like such as "on connection on 1ch" on the display unit 15b of the user interface unit 15.

Thus, in the above-described embodiment, when there is a channel connection instruction from the user, if the channel is Non-PSC, the control unit 16 automatically makes a connection on PSC, and then, transmits a channel switching instruction to the DUT 100 to switch to Non-PSC.

Thus, when there is an instruction to make a connection on Non-PSC, the connection is made on PSC and then switched to Non-PSC. Therefore, it is possible to measure any channel without the user being aware of whether the channel is PSC or Non-PSC.

Further, even when the DUT 100 scans only PSC, the connection with the DUT 100 and the measurement can be reliably performed.

In addition, the channel selection control unit 12 causes the wireless communication unit 13 to transmit the Channel Switch Announcement frame including information on the switching destination channel, which is defined in IEEE 802.11, as a channel switching instruction to the DUT 100 to switch the channel.

This allows switching from PSC to Non-PSC by the Channel Switch Announcement frame defined in IEEE 802.11, and allows channel switching without defining and enabling a special channel switching instruction.

Although an embodiment of the present invention has been disclosed, it will be apparent that modifications may be made by those skilled in the art without departing from the scope of the present invention. All such modifications and equivalents are intended to be included in the following claims.

DESCRIPTION OF REFERENCE NUMERALS AND SIGNS 1 measurement apparatus
12 channel selection control unit
13 wireless communication unit
13a Transmission unit
13b Reception unit
14 RF measurement unit
16 control unit
100 DUT (communication device)

What is claimed is:

1. A measurement apparatus which measures a radio signal transmitted and received by a communication device to measure transmission and reception characteristics of the communication device, the measurement apparatus comprising:
a signal generator configured to generate signals that include control data for communicating with the communication device that transmits and receives the radio signal and measurement data;
a channel selector configured to select a channel to be used by the communication device from among a plurality of channels supported by the communication device;
a wireless transceiver configured to make a network connection with the communication device through the channel selected by the channel selector;
a radio frequency (RF) detector configured to measure transmission and reception characteristics of the communication device on the channel through which the network connection between the wireless transceiver and the communication device is made;
a user interface configured to receive an input;
a display configured to display a setting screen or a measurement result; and
a controller,
wherein when a Non-Preferred Scanning Channel (Non-PSC) is designated as the channel to be used for the network connection between the wireless transceiver and the communication device, the controller is configured to make the network connection with the communication device on a Preferred Scanning Channel (PSC) and transmit a channel switching instruction to the communication device to switch to the Non-PSC without disconnecting the network connection with the communication device, and
wherein when the channel switch function is turned off, and when the Non-PSC is designated as the channel to be used for the network connection between the wireless transceiver and the communication device, the controller is configured to make the network connection with the communication device on the designated Non-PSC.

2. The measurement apparatus according to claim 1, wherein a Channel Switch Announcement frame or an Extended Channel Switch Announcement frame defined in IEEE 802.11 is used as the channel switching instruction.

3. A Non-Preferred Scanning Channel (Non-PSC) connection method, the Non-PSC connection method comprising:
a step of generating signals including control data for communicating with a communication device;
a step of transmitting and receiving a radio signal and measurement data;
a step of selecting a channel to be used by the communication device from among a plurality of channels supported by the communication device;
a step of making a network connection with the communication device through the selected channel;
a step of measuring transmission and reception characteristics of the communication device on the selected channel;
a step of receiving an operation input from a user to display a target to be operated;
a step of determining that a channel to which a connection instruction is input is the Non-PSC;
a step of connecting to the communication device on a Preferred Scanning Channel (PSC) after it is determined that the channel is the Non-PSC;
a step of transmitting a channel switching instruction to the communication device to switch to the Non-PSC without disconnecting the network connection with the communication device, after the connection is made on the PSC;
a step of setting, based on the Non-PSC being designated as the channel to be used for the network connection with the communication device, the channel switching function of transmitting a channel switching instruction to the communication device to be turned off; and
a step of making, based on the channel switching function being turned off by the step of setting the channel switching function to be turned off, and based on the Non-PSC being designated as the channel to be used for the network connection with the communication device, the network connection with the communication device on the designated Non-PSC.

4. The Non-PSC connection method according to claim 3, wherein a Channel Switch Announcement frame or an Extended Channel Switch Announcement frame defined in IEEE 802.11 is used as the channel switching instruction.

* * * * *